Figure 1:
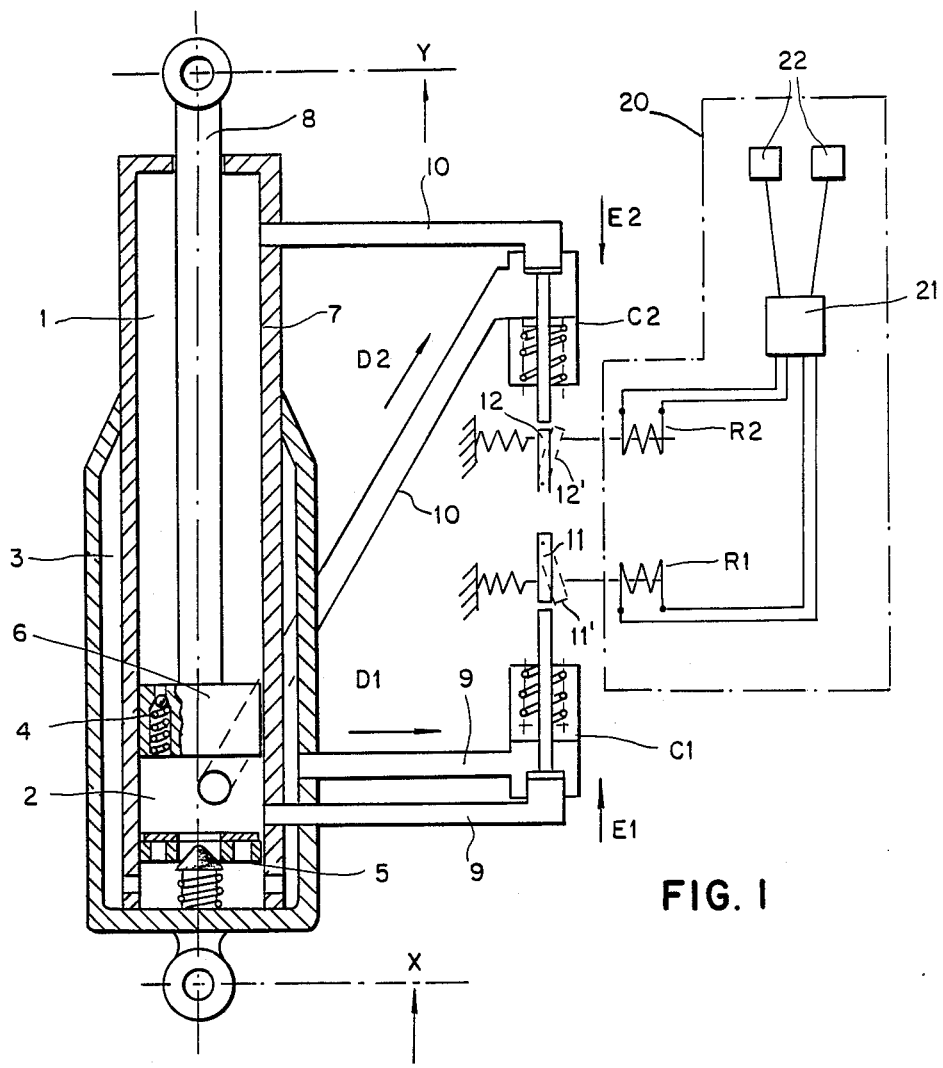

United States Patent [19]
Schnittger

[11] Patent Number: 4,743,046
[45] Date of Patent: May 10, 1988

[54] ACTIVE VEHICLE SUSPENSION UNIT

[76] Inventor: Jan R. Schnittger, 135 Putnam Rd., Holden, Mass. 01520

[21] Appl. No.: 12,823
[22] PCT Filed: May 6, 1986
[86] PCT No.: PCT/SE86/00212
 § 371 Date: Jan. 9, 1987
 § 102(e) Date: Jan. 9, 1987
[87] PCT Pub. No.: WO86/06807
 PCT Pub. Date: Nov. 20, 1986

[30] Foreign Application Priority Data
 May 13, 1985 [SE] Sweden ............................. 8502366

[51] Int. Cl.$^4$ .............................................. B60G 11/26
[52] U.S. Cl. ............................... 280/707; 280/710; 280/714
[58] Field of Search .................... 280/707, 710, 714

[56] References Cited
U.S. PATENT DOCUMENTS

| | | | |
|---|---|---|---|
| 4,000,910 | 1/1977 | Unruh et al. | 280/710 |
| 4,154,461 | 5/1979 | Schnittger | 280/710 |
| 4,468,050 | 8/1984 | Woods et al. | 280/707 |
| 4,468,739 | 8/1984 | Woods et al. | 280/714 |
| 4,591,186 | 5/1986 | Ashiba | 280/707 |

FOREIGN PATENT DOCUMENTS

| | | |
|---|---|---|
| 3438467 | 5/1985 | Fed. Rep. of Germany . |
| 1450441 | 9/1976 | United Kingdom . |
| 1485003 | 9/1977 | United Kingdom . |
| 2135020 | 8/1984 | United Kingdom . |

*Primary Examiner*—Kenneth R. Rice
*Attorney, Agent, or Firm*—Malcolm B. Wittenberg

[57] ABSTRACT

A hydraulic shock absorber with a generally vertical cylinder encasing therein hydraulic liquid and a piston which partitions the interior of the cylinder into two liquid chambers, an upper and lower chamber. Improved damping control is achieved by a circuit forming a connection between the two liquid chambers, a further circuit connecting the reservoir to the lower liquid chamber, each of the two circuits including a controllable first check valve and second check valve, respectively, that can take two states of operation under the action of a control device. The first state resulting in locking the valve in a closed position, cutting off the forward flow through the check valve, and in a second state allowing a free forward flow through the check valve, whereas the check valve in the first state as well as in the second state blocks the reverse flow of both circuits.

19 Claims, 1 Drawing Sheet

ACTIVE VEHICLE SUSPENSION UNIT

BACKGROUND OF THE INVENTION

The present invention relates to vehicle suspension systems and more particularly, to a vehicle suspension system in which control means incorporating a micro processor or computer controls the damping of a shock absorber to optimize riding and handling characteristics under a wide range of driving conditions. The control means comprise sensors which provide signals to the micro processor which are representative of the vehicle riding comfort. The control means actively affect the shock absorber operation utilizing programmed algorithms.

STATE OF THE ART

In the U.S. Pat. No. 4,154,461, May 15, 1979, a concept of a dual state shock absorber for a vehicle wheel is introduced.

In said patent there is arranged a throttling valve, combining the upper and lower fluid chambers of a shock absorber cylinder, said valve being fixed in one of two different positions under the influence of an external control means. By this arrangement the shock absorber would offer either "soft", i.e. low damping or "stiff", i.e. high damping, respectively, to resist either compressive or expansive movements of the shock absorber.

The decision whether the damping should be stiff or soft is made dependent on the sensor signals $\dot{y}$, representing the vehicle vertical velocity (positive upwards), and the signal indicating the compression or expansion sense of the shock absorber as expressed by $(\dot{y}-\dot{x})$. Here x is the vertical displacement upwards of the wheel and therefore $(\dot{y}-\dot{x})$ is positive for expansion and negative for compression of the shock absorber.

It is also shown by said patent that the decision about soft or stiff damping could be made entirely dependent on the sign of the variable $S=\dot{y}\cdot(\dot{y}-\dot{x})$. Obviously the arrangement according to said patent would call for two sensors; one sensor being an accelerometer on the car body to yield $\dot{y}$ and one sensor indicating the compression or expansion of the shock absorber.

The present invention relates to a hydraulic shock absorber including a generally vertical cylinder receiving therein hydraulic liquid, a piston working in the cylinder and partioning the interior thereof into two liquid chambers, an upper and a lower chamber, two sets of one or more damping force generating check valves mounted on the piston, one set generating the damping force in the expansion stroke and another set allowing free flow from the lower to the upper chamber in the compression stroke, a piston rod secured to the piston extending through the end of the cylnder to the outside, said sets of valves constituting connections between the two liquid chambers, a liquid reservoir connected to the lower liquid chamber by a third set of check valves generating the damping force in the compression stroke and allowing a return free flow from the reservoir to the lower chamber in the expansion stroke.

The invention presents a mechanical design to improve the speed and accuracy of the damping control and to simplify the sensor installation. This is achieved by a circuit forming a connection between the two liquid chambers, a further circuit connecting the reservoir to the lower liquid chamber, each of the two circuits including a controllable first check valve and second check valve, respectively, that can each take two states of operation under the action of a control means, in a first state locking the valve in a closed position cutting off the forward flow through the check valve, and in a second state allowing a free forward flow through the check valve, whereas the check valve in the first state as well as in the second state block the reverse flow of both circuits.

In a second embodiment the control means comprise a locking device keeping the check valve head in sealing engagement with the valve seat to cut off the forward flow.

In a third embodiment the locking device comprises a rocking lever barring the valve head in its sealed engagement in one position and setting the valve head free in one or more further positions.

In a fourth embodiment the control means for the check valves comprise electric relays.

In a fifth embodiment the control means are under the action of signals from sensors for stating the vertical speed and/or acceleration of the vehicle body or the wheel, said signals being entered into a CPU micro processor comprised in the control means.

In a sixty embodiment the control means is programmed to put the check valves in a basic mode or zero mode, Mode 0, when the acceleration signal from the vehicle body or the wheel is within predetermined values, to impart a free state, the second state, allowing free forward flow to both check valves in case the vehicle body acceleration signal is not exceeding a predetermined limit value of the acceleration signal, and to impart a locked state, the first state, to both check valves in case the wheel acceleration signal is not exceeding a predetermined limit value of the acceleration signal.

In a seventh embodiment the control means is programmed to put the check valves in a first mode, Mode 1, when any of the acceleration signals exceeds the high limit value, to impart a free, second state to the first check valve and a locked, first state to the second check valve, meaning a soft compression and a stiff expansion of the shock absorber.

In an eighth embodiment the control means are programmed to put the check valves in a second mode, Mode 2, when any of the acceleration signals passes below the low limit value, to impart a locked, first state to the first check valve and a free, second state to the second check valve, meaning stiff compression and a soft expansion of the shock absorber.

In a nineth embodiment the control means are programmed to retain Mode 1 or Mode 2 for a predetermined time after the acceleration value has reentered within the acceleration tolerance band, defined by the limit values, and after the expiration of the predetermined time to return to Mode 0.

In a tenth embodiment the control means are programmed to put the check valves in a third mode, Mode 3, when a signal representing the counting of the number of cycles within a given time interval exceeds a predetermined value, or the acceleration signal time derivative exceeds a given value, said Mode 3 imparting to both check valves a locked, first state.

The invention further teaches principles of electronic control means to balance the conflicting requirements or ride comfort and road holding as well as bringing the suspension control in harmony with braking and steering actions.

DRAWINGS

Figure 2:
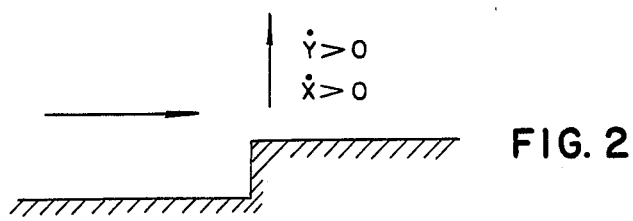
Figure 3:
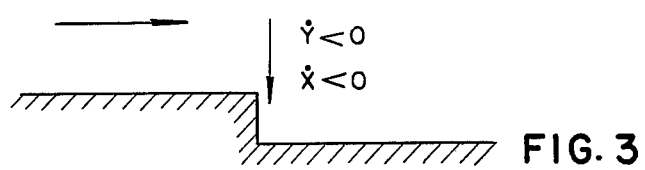

The invention will now be described in more detail referring to the drawings in which FIG. 1 is a schematic drawing of a shock absorber according to the invention, FIG. 2 is a sketch of an upward edge as hit by the wheel, and FIG. 3 is a corresponding downward edge.

THE MECHANICAL DESIGN

Reference is made to FIG. 1. The patent may be applied to different designs of conventional shock absorbers. FIG. 1 refers, however, schematically to an absorber of common design where a piston 6 moves in a cylinder 7. The piston divides the space in the cylinder so as to have an upper chamber 1 and a lower chamber 2.

During compression the piston rod 8 is introduced further into the cylinder 7, whereby the cylinder cannot contain as much fluid as before. The excess fluid in connection with a compressive movement is transferred to the reservoir 3.

In the compressive movement the main flow resistance is offered by one or more check valves 5. Valves 4 in the piston 6 may or may not offer an important flow resistance to the flux from the lower chamber 2 to the upper chamber 1.

At an expansive movement the valves 4 are important for the damping, whereas opposite valves 5 must not restrict the return flow from the reservoir 3 to chamber 2, which would cause a harmful partial vacuum in chamber 2.

The valves 4 and 5 correspond entirely to the throttling of the flow in any conventional shock absorber. They may or may not be springloaded so as to vary their flow cross section as a function of the pressure difference across the valves.

The present invention contains two bypass circuits, one for compression, 9, and one for expansion, 10. It should be obvious that an unrestricted circuit 9 would allow the flow under compression to bypass the throttling valve 5, so that the piston 6 would meet a very low degree of damping. The same is true about circuit 10 in expansion, which would bypass the throttling valves 4.

Now the bypass circuits 9 and 10 are not unconditionally open and unrestricted for the flow. The circuit 9 is provided with a valve C1 and the circuit 10 with a valve C2. Fundamentally these two valves of relief have only two modes, namely free, i.e. unlocked, or locked, i.e. in a closed position.

There are of course several valve designs. Thus one arrangement contains relay operated valves, which may be of several alternative designs like "direct relay on valve" or "small valve directly operating a larger slave valve opened by control of pressure by means of the small valve".

However, a very effective and low power valve is now introduced. Here valves C1 and C2 are springloaded check valves, which are closed when the flow is in the directions indicated by arrows D1 and D2 respectively.

When the flow is in the directions indicated by arrows E1 or E2, respectively, there could be a flow across the check valves. Those respective flows are, however, conditioned upon the action of relays R1 and R2. These electromagnetic relays R1 and R2 do not act directly on the valves C1 or C2. Instead they control a locking device, which either fix the valves in a closed position or leave the valves free to open when subjected to a pressure difference by a flow in the E1 or E2 direction.

The construction of the locking device may follow different design principles. One could be a pair of jaws as in a tool (pincers, pliers) with a very small and effective motion. Another tested design is indicated in FIG. 1 and consists of a small springloaded lever 11 or 12, which may be placed in any of two positions 11-11', 12-12' by the respective relay R1 or R2.

This locking design requires a very small amount of power since the relay does not work against the fluid pressure. The motion need not be large and the locking mechanism has very small inertial forces. Switch times of the order of a few milliseconds are easily achieved with this kind of locking devices.

CONTROL MEANS

The control means for the shock absorber of the active vehicle suspension unit consist of one or two sensors 22, an electronic microprocessor unit 21 (CPU) and a power circuit to activate the relays R1 and R2.

The basic sensor needed to control the shock absorber for one wheel in a given vehicle is an accelerometer. This sensor may be attached to the car body immediately above the wheel, Embodiment I, or it may be fixed to the wheel support, i.e. to the unsprung mass, Embodiment II.

In Embodiment I a second sensor is used to count the number of cycles of the shock absorber (from compression to expansion and back to compression) in a given short time interval. This second sensor could be of different types. Thus a simple pressure sensor in circuit 9 or a limit switch device, preferably contactless, on C1 would suffice.

The relay switch time is easily decreased considerably by using a capacitor charge power circuit which gives the relay a momentary current much larger than the relay would withstand in steady state.

The microprocessor unit 21 comprises an A/D circuit to convert the accelerometer analogue signal into a digital signal to be processed by the CPU. Further the CPU unit has a ROM memory containing one or more programs according to the selected control principle of different modes of operating the active vehicle suspension unit. Therefore the electronic unit primarily comprises several input ports for the sensor(s), and A/D circuit, a CPU, a permanent memory ROM and two output ports to activate the power circuits of the relays R1 and R2.

CONTROL PRINCIPLES

When the vehicle is running along a smooth, flat road one desires the suspension system to operate in a fundamental mode, the zero mode or MODE 0. Depending upon where the sensor/accelerometer is placed the fundamental mode will be defined differently. The desirable general behaviour of the shock absorber requires that the fundamental Mode 0 will be abandoned temporarily when the wheel is negotiating an upward or a downward edge, see FIG. 2 and FIG. 3 respectively.

Thus, consider what happens when a wheel passes an upward and a downward edge respectively.

When the wheel hits the upward edge of FIG. 2 the shock absorber will be rapidly compressed and the vehicle will be pressed upwards. It is obviously desirable that the shock absorber will absorb the obstacle with a minimum of resisting force, i.e. the damping should be low or soft. Passing an upward edge $\dot{y}$ is positive and $(\dot{y}-\dot{x})$ is negative and therefore $S=\dot{y}(\dot{y}-\dot{x})$ is a negative quantity. In the final phase when the wheel has passed the upward edge the vehicle body will still be moving upwards ($\dot{y}>0$) and "overshoot" the final equilibrium level when the spring recoils and the shock absorber is expanding, $(\dot{y}-\dot{x})>0$. One would like to prevent this overshoot by exerting a stiff damping force. Since the compression has changed to expansion the sign of S has also changed and become positive.

When passing a downward edge as indicated in FIG. 3 the wheel will tend to loose contact with the road surface. The shock absorber is expanding and the vehicle body tends to fall. At this instant we like the expansion to be rapid to restore the contact quickly. The sign of S is negative since $\dot{y}$ is negative and $(\dot{y}-\dot{x})$ is positive.

Again we see that the desired soft damping is indicated by the negative sign of S. Finally in the ultimate phase of the passage of the downward edge there will be a tendency to "overshoot" so that the car has a movement to "bottom" into the shock absorber. One would like the damping to be stiff and the downward motion $\dot{y}<0$ in combination with the compression, $(\dot{y}-\dot{x})<0$, creates a product of two negative quantities, therefore S is positive, once again indicating that we should put on a stiff damping.

The conclusion is that the desirable behaviour of the suspension system could be expressed in the following table:

TABLE I

| Required damping at edges. | | |
|---|---|---|
| | Before edge | After edge |
| Upward edge | $\dot{y}>0$ | $\dot{y}>0$ |
| | (upwards) | (upwards) |
| (FIG. 2) | $(\dot{y}-\dot{x})<0$ | $(\dot{y}-\dot{x})>0$ |
| | (compression) | (expansion) |
| Mode 1 | SOFT damping | STIFF damping |
| Downward edge | $\dot{y}<0$ | $\dot{y}<0$ |
| | (downwards) | (downwards) |
| (FIG. 3) | $(\dot{y}-\dot{x})>0$ | $(\dot{y}-\dot{x})<0$ |
| | (expansion) | (compression) |
| Mode 2 | SOFT damping | STIFF damping |

Summarizing the above we may immediately translate the results regarding the Mode 0 and the behaviour at an upward edge, Mode 1, and at downward edge, Mode 2, into a corresponding control scheme for the C1 and C2 valves:

TABLE II

| | Valve control scheme | | | |
|---|---|---|---|---|
| Mode | Vertical velocity $\dot{y}$ | Valve C1 | Valve C2 | Damping |
| Mode 0 Embodiment I accelerometer for $\ddot{y}$ on car | 0 | free | free | SOFT |
| Mode 0 Embodiment II accelerometer for $\ddot{x}$ on wheel support | 0 | locked | locked | STIFF |
| Mode 1 (upward edge) | $\dot{y}>0$ (positive) | free | locked | SOFT at compression STIFF at expansion |
| Mode 2 (downward edge) | $\dot{y}<0$ (negative) | locked | free | STIFF at compression SOFT at expansion |

Valve control given in table II requires that one has integrated the $\ddot{y}$-signal over time to obtain $\dot{y}$.

However, it has been found that one could use the acceleration signal $\ddot{y}$ directly in the electronic data processing for the control of the valves, thus making integration unnecessary. The acceleration signal $\ddot{y}$ is obviously an earlier indication of an approaching edge than is the integrated signal $\dot{y}$. On the other hand, the acceleration signal is more sensitive and more noisy. This particularly is the case when the sensor is an accelerometer (for $\ddot{x}$) fixed to the unsprung mass as in Embodiment II.

This fact has also been reflected in the design of Mode 0, where Embodiment II has a stiff damping whereas Embodiment I has a soft damping. The detection of an upward edge for Embodiment I is of course somewhat slower than for Embodiment II, because in the first case the sensor is on the car body. However, compare the sequence of events for the two embodiments:

EMBODIMENT I

Transfer from Mode 0 to Mode 1, see Table II

Since C1 is already in the free mode, the first part of the transfer is already done. The second part should have C2 transferred to the locked state, but that can easily be done without complication during the first part of the encounter with the upward edge.

Transfer from Mode 0 to Mode 2, see Table II

The first part calls for a free C2, which is already the case. Again there is time to prepare the locking of the C1.

EMBODIMENT II

In Embodiment II, C1 and C1 are locked. Therefore there is no immediate preparedness to meet a roughness in the road. Thus the shift of valve mode must occur in the beginning of the first part of the encounter with the edge. However, the sensor is on the wheel and the edge is detected earlier. Since the control in the practical case is made directly from the acceleration signal the edge will be detected quite early and therefore the result for Embodiment II will be similar to that of Embodiment I.

Control to Transfer Between the Different Modes 0, 1 and 2

To suppress small, noisy signals from the road and from the different, small scale vibrations in the car body it is necessary to introduce a tolerance band $\pm a$ m/s$^2$ of acceleration. Within the tolerance band $\pm a$ the Mode 0 is to prevail.

Outside the band there will be a transfer to Mode 1 or Mode 2. Once a transfer to either one has occurred the new mode will be retained a hold time $t_h$ even after the signal magnitude has returned to stay within the tolerance band. Therefore one has the following scheme in common to both Embodiments:

TABLE III

Mode changes at accelerations exceeding $\pm a\ m/s^2$

| Accelerometer signal | Mode | Remark |
|---|---|---|
| $-a < \ddot{y}$ or $\ddot{x} < a$ | Mode 0 | No change of Mode |
| $\ddot{y}$ or $\ddot{x} > a$ | Mode 1 | The Modes 1 or 2 resp. will be retained $t_h$ sec after the signal returns inside the tolerance band. |
| $\ddot{y}$ or $\ddot{x} < -a$ | Mode 2 | |

Optimation of Suspension Characteristics

All conventional suspension systems are compromises between the demand for ride comfort and the need for good contact between the wheel and the road (road holding).

The ride comfort is disturbed by the car heaving in a frequency range corresponding to the natural oscillation of the car body on its suspension springs. The second natural vibration occurs when the unsprung wheel system flutters on a wash board road with relatively small displacements of the car body. This results in a bad road contact for the wheel. Depending on the amplitude of the road roughness the shocks imparted by one or several wheels to the car body may be lowering the ride comfort.

It is the merit of the present invention that it allows a much more sophisticated approach to the optimation of a vehicle suspension in harmony also with the braking and steering actions and corresponding conditions.

The acceleration sensor of Embodiment II or the pulse counter of Embodiment I would either one enable the electronic unit to recognize the occurrence of wheel flutter.

This flutter would occur typically at a natural frequency five times that of the car on its springs. The suppression of the wheel flutter is of course desirable in order to improve the road holding of the car. We may thus introduce still another Mode 3, with both check valves C1, C2 in a locked position. Mode 3 is equal to Mode 0 for Embodiment II, but it is convenient to consider Mode 3 as a separate mode depending on the number $n_c$ of pulses counted in a given short time interval, "COUNT", which is tuned individually for any given vehicle model.

The microprocessor unit would allow a large number of different combinations to connect road holding with ride comfort, braking or steering actions. Therefore the electronic unit may have several extra input ports relating the suspension to the braking or steering systems. The following Table IV demonstrates the basic scheme for the transfer from Mode 0, 1 or 2 to Mode 3:

TABLE IV

| Modes related to COUNT. | | |
|---|---|---|
| Counter below critical $n_c$ | Counter above critical $n_c$ | Remark |
| No action | Transfer to Mode 3, both C1 and C2 locked | The transfer to Mode 3 may be optional. Thus the driver may overrule the transfer |

TABLE IV-continued

| Modes related to COUNT. | | |
|---|---|---|
| Counter below critical $n_c$ | Counter above critical $n_c$ | Remark |
| | | by a manual command. |

I claim:

1. Vehicle suspension system with one or more shock absorbers, each shock absorber comprising, a hydraulic cylinder, receiving therein hydraulic liquid, a piston working in said cylinder, partitioning the interior of said cylinder into an upper chamber and a lower chamber, damping force generating means controlling flow from said upper and lower chambers including adjustable valve means controlled by control means to be in a soft mode to provide soft damping characteristics or in a stiff mode to provide stiff damping characteristics in either the compression stroke or the expansion stroke of said shock absorber, said control means being responsive to signals from sensors for signaling the vertical speed ($\dot{y}$, $\dot{x}$) and/or acceleration ($\ddot{x}$, $\ddot{y}$) of the vehicle body (y) or the wheel (x), said signal being entered into a signal processor in said control means to impart either of said soft or stiff characteristics by means of said adjustable valve means, comprising first valve means providing a variable damping force in the compression stroke, and second valve means providing a variable damping force in the expansion stroke, characterized in that said first valve means include a first controllable valve which is closed to flow during said expansion stroke and which has two states of operation during said compression stroke under the control of said control means, namely on one hand a closed state in which the flow path from said lower chamber is closed to provide a relatively stiff damping mode by the further valve means and, on the other hand an open state in which the flow path from said lower chamber is relatively unrestricted to provide a relatively soft damping mode, and said second valve means include a second controllable valve means which is closed to flow during said compression stroke and which has two states of operation during said expansion stroke under the control of said control means, namely on one hand a closed state in which the flow path from said upper chamber is closed to provide a relatively stiff damping mode by the further valve means and, on the other hand an open state in which the flow path from said upper chamber is relatively unrestricted to provide a relatively soft damping mode.

2. A vehicle suspension system according to claim 1 which is further characterized by said control means being programmed, such that when body acceleration is sensed said first and second valve means are in a zero mode when the acceleration signal ($\ddot{y}$) from the vehicle body is within predetermined values ($-a < \ddot{y} < +a$), wherein said zero mode is characterized by both said valve means being placed in their soft states when the vehicle body acceleration signal ($\ddot{y}$) is not exceeding predetermined limit values of the acceleration signal ($\pm a$).

3. A vehicle suspension system according to claim 1, characterized by said control means being programmed such that when wheel acceleration ($\ddot{x}$) is sensed, said first and second valve means are in a zero mode when the acceleration signal ($\ddot{x}$) from the vehicle wheel is within predetermined values ($-a<\ddot{x}<+a$), wherein zero mode is characterized by both said valve means being placed in said firm states when the vehicle wheel acceleration signal ($\ddot{x}$) is not exceeding predetermined limit values of the acceleration signal ($\pm a$).

4. A vehicle suspension system according to claims 2 or 3, characterized by said control means being programmed to put said first and second valve means in a first mode when either of the acceleration signals ($\ddot{y}$, $\ddot{x}$) exceeds the high limit value ($+a$), to impart said soft state to the first valve means and said firm state to said second valve means to thereby effect a soft compression characteristic and a stiff expansion characteristic to said shock absorber.

5. A vehicle suspension system according to claim 2 or 3, characterized by the control means being programmed to put said first and second controllable valve means in a second mode when either of the acceleration signals ($\ddot{y}$, $\ddot{x}$) passes below the low limit values ($-a$), to impart said firm state to said first valve means and a soft state to said second valve means to thereby effect a stiff compression characteristic and a soft expansion characteristic to said shock absorber.

6. A vehicle suspension system according to claim 4, characterized by the control means being programmed to retain said first mode or second mode for a predetermined time ($t_h$) after the acceleration value has reentered within the acceleration tolerance band defined by the limit values ($-a$ and $+a$) and after the expiration of the predetermined time ($t_h$) to return to said zero mode.

7. A vehicle suspension system according to claim 5, characterized by the control means being programmed to retain said first mode or second mode for a predetermined time ($t_h$) after the acceleration value has reentered within the acceleration tolerance band defined by the limit values ($-a$ and $+a$) and after the expiration of the predetermined time ($t_h$) to return to said zero mode.

8. A vehicle shock absorber according to claim 1, characterized by the control means being programmed to put said first and second valve means in a third mode when a signal to said control means representing the counting of the number of cycles within a given time interval exceeds a predetermined value ($N_c$), or the acceleration signal time derivative (x or y) exceeds a given valve (b m/s$^3$) said controller imparting to both of said value means said firm state.

9. Vehicle suspension system with one or more shock absorbers, each shock absorber including a generally vertical cylinder receiving therein hydraulic liquid, a piston working in the cylinder and partitioning the interior thereof into two liquid chambers,
an upper and lower chamber,
two sets of one or more damping force generating valve means mounted on the piston for regulating flow between the lower and the upper chambers,
a piston rod secured to the piston extending through the upper end of the cylinder to the outside, said force generating valve means constituting connections between the two liquid chambers, a liquid reservoir connected to the lower liquid chamber by a third set of check valves generating a damping force in the compression stroke and allowing a return free flow from the reservoir to the lower chamber in the expansion stroke, characterized by
a circuit forming a connection between the two liquid chambers,
a further circuit connecting the reservoir to the lower liquid chamber,
each of the two circuits including a controllable first check valve and second check valve, respectively, that can each take two states of operation under the action of a control means, in a first state locking the valve in a closed position cutting off the forward flow through the check valve, and in a second state allowing a free forward flow through the check valve, whereas the check valve in the first state as well as in the second state block the reverse flow of both circuits.

10. Vehicle suspension system according to claim 9, characterized by the control means comprising a locking device keeping the check valve head in sealing engagement with the valve seat to cut off the forward flow.

11. Vehicle suspension system according to claim 10, characterized by the locking device comprising a rocking lever barring the valve head in its sealed engagement in one position, and letting the valve head free in one or more further positions.

12. Vehicle suspension system according to claim 9, characterized by that the control means for the check valves comprises electric relays.

13. Vehicle suspension system according to claim 2, characterized by the control means being under the action of signals from sensors for stating the vertical speed and/or acceleration of the vehicle body or the wheel ($\dot{y}$, $\dot{x}$, $\ddot{y}$, $\ddot{x}$), said signals being entered into a CPU micro processor located within said control means.

14. Vehicle suspension system according to any of claims 9-13, characterized by the control means being programmed to put the check valves in a basic mode or zero mode,
such that when the acceleration signal from the vehicle body or the wheel ($\ddot{y}$ and $\ddot{x}$, respectively) is within predetermined values ($-a<\ddot{x}$ or $\ddot{y}<+a$),
to impart a free state or second state, allowing free forward flow to both check valves in case the vehicle body acceleration signal ($\ddot{y}$) is not exceeding a predetermined limit value of the acceleration signal ($\pm a$ m/s$^2$), and
to impart a locked state or first state, to both check valves in case the wheel acceleration signal ($\ddot{x}$) is not exceeding a predetermined limit value of the acceleration signal ($\pm a$ m/s$^2$).

15. Vehicle suspension system according to any of claims 9-13, characterized by the control means being programmed to put the check valves in a first mode,
when either of the acceleration signals ($\ddot{y}$, $\ddot{x}$) exceeds the high limit value ($\pm a$ m/s$^2$), to impart a free, second state, to the first check valve and a locked, first state, to the second check valve, meaning a soft compression and a stiff expansion of the shock absorber.

16. Vehicle suspension system according to any of claims 9-13, characterized by the control means being programmed to put the check valves in a second mode,
when either of the acceleration signals ($\ddot{y}$, $\ddot{x}$) pass below the low limit value ($-a$ m/s$^2$), to impart a locked, first state, to the first check valve and a free, second state, to the second check valve, meaning a stiff compression and a soft expansion of the shock absorber.

17. Vehicle suspension system according to claim 13, characterized by the control means being programmed to retain the first mode or the second mode for a predetermined time ($t_h$ sec) after the acceleration value has reentered within the acceleration tolerance band, defined by the limit values ($-a$ m/s$^2$ and $+a$ m/s$^2$) and after the expiration of the predetermined time ($t_h$ sec) to return to zero mode.

18. Vehicle suspension system according to claim 16, characterized by the control means being programmed to retain the first mode or the second mode for a predetermined time ($t_h$ sec) after the acceleration value has re-entered within the acceleration tolerance band, defined by the limit values ($-a$ m/s$^2$ and $+a$ m/s$^2$) and after the expiration of the predetermined time ($t_h$ sec) to return to zero mode.

19. Vehicle suspension system according to any of claims 9–13, characterized by the control means being programmed to put the check valves in a third mode,
when a signal representing the counting of the number of cycles within a given time interval exceeds a predetermined value ($N_c$), or the acceleration signal time derivative ($\dddot{x}$ or $\dddot{y}$) exceeds a given value (b m/s$^3$),
said third mode imparting to both check valves a locked, first state.

* * * * *